United States Patent

Saad et al.

[11] Patent Number: 5,562,874
[45] Date of Patent: Oct. 8, 1996

[54] MULTILAYERED ANTIOXIDANT FILM

[75] Inventors: Zain E. Saad; Carlton E. Beyer, both of Midland, Mich.

[73] Assignee: Dowbrands L.P., Indianapolis, Ind.

[21] Appl. No.: 168,321

[22] Filed: Dec. 17, 1993

[51] Int. Cl.$^6$ ............... B29C 47/06; B29C 55/28
[52] U.S. Cl. ............ 264/177.14; 264/211; 264/514; 264/515; 264/209.1; 264/343; 264/466
[58] Field of Search ............... 428/369, 349, 428/514, 537.5; 264/177.14, 211, 343, 514, 515, 209.1, 22, 78

[56] References Cited

U.S. PATENT DOCUMENTS

| | | | |
|---|---|---|---|
| 2,991,193 | 7/1961 | Fessler et al. | 117/68 |
| 3,429,717 | 6/1974 | Cook | 428/348 |
| 3,814,821 | 6/1974 | Oliver et al. | 426/265 |
| 4,624,679 | 11/1986 | McEstee | 8/650 |
| 4,880,696 | 11/1989 | Yanidis | 428/349 |
| 5,382,391 | 1/1995 | Juhl et al. | 264/22 |

*Primary Examiner*—Charles Nold

[57] ABSTRACT

A coextruded multilayer film having increased retention of volatile antioxidants and process for making the film. The multilayer film includes an antioxidant layer containing a volatile antioxidant, said antioxidant layer being semipermeable to the volatile antioxidant; and a barrier layer, impermeable to the volatile antioxidant. The film can be produced on a conventional blown film process with the barrier layer coextruded externally to the antioxidant layer. The barrier layer traps the volatile antioxidant inside the tube of the blown film process, reducing the amount of volatile antioxidant migrating from the film.

10 Claims, No Drawings

5,562,874

MULTILAYERED ANTIOXIDANT FILM

BACKGROUND OF THE INVENTION

This invention relates to thermoplastic films suitable for manufacturing containers for improving and extending the storage life of meat and other foodstuffs. More specifically, this invention relates to coextruded multilayer thermoplastic films containing volatile antioxidants.

Adding volatile antioxidants into packaging materials is known in the art. For example, this technique has been used in the cereal industry where volatile antioxidants such as butylated hydroxytoluene ("BHT") and butylated hydroxyanisole ("BHA") are added to the packaging materials for cereal liners. One way of accomplishing this is to blend the antioxidant with a thermoplastic polymer which can then be extruded to form a layer of the packaging material.

High levels of volatile antioxidants in food packaging materials cause migration of some of the antioxidant from the packaging material and into the food. The amount of antioxidant used in the packaging material impacts the amount of antioxidant that migrates to the food.

Previously, the amount of volatile antioxidant that could effectively be incorporated into thermoplastic packaging materials was limited because of the tendency of the antioxidant to evaporate from the polymer during extrusion. Additionally, storage of the packaging material itself is a concern because the volatile antioxidants can migrate out of the material during storage, reducing the amount of antioxidant remaining in the packaging material at the time the packaging material is actually used to store foodstuffs.

U.S. Pat. No. 4,880,696 issued to Yanidis ("Yanidis") discloses a method for increasing the amount of antioxidant incorporated into a packaging material produced using an extrusion coating process. Yanidis teaches extruding a thermoplastic composition, comprising an antioxidant-containing layer and a more remote thermoplastic layer, onto a substrate such that the antioxidant-containing layer becomes sandwiched between the substrate and the more remote layer. Since the antioxidant-containing layer becomes sandwiched soon after being extruded, evaporation of the antioxidant is reduced.

The antioxidant-containing layer in Yanidis is exposed to open air for a brief period of time after the layer is extruded and before the layer is coated onto the substrate. This exposure to open air allows some of the volatile antioxidant to escape, reducing the amount of volatile antioxidant left in the material to be available for its intended purpose. Additionally, the more remote thermoplastic layer in Yanidis is also exposed to open air during processing and may also be exposed to open air after processing and during storage before being used in the manufacture of containers. This exposure to open air allows volatile antioxidants to migrate through the more remote thermoplastic layer and escape into the open air, further reducing the amount of volatile antioxidant left in the material to be available for its intended purpose. Thus, a need exists in the industry for further reducing the amount of volatile antioxidant that escapes or evaporates during processing of antioxidant-containing materials.

Additionally, the process of extrusion coating a substrate, as is done in Yanidis, can be too slow for efficient production of some articles made from antioxidant-containing materials. Thus, a need exists in the industry for increasing processing rates for producing such antioxidant-containing materials.

SUMMARY OF THE INVENTION

The Applicants have found a way of reducing even further the amount of antioxidant that evaporates or otherwise escapes during manufacture of packaging materials containing volatile antioxidants. This reduction in loss of antioxidant allows the production of packaging materials retaining a higher percentage of the original amount of antioxidant. This higher retention rate allows production of packaging materials containing increased amounts of volatile antioxidants. Applicants have also found a way of producing these packaging materials containing increased amounts of volatile antioxidants at processing rates that are higher than the processing rates that can be achieved from extrusion coating.

The present invention relates to coextruded multilayer films, containing a volatile antioxidant, suitable for making packaging materials useful for improving and extending the storage life of meat and other foodstuffs that are susceptible to oxidation and oxidative rancidity.

More specifically, the present invention relates to coextruded multilayer films comprising an antioxidant-containing layer, semipermeable with respect to the volatile antioxidant, and a barrier layer impermeable to the antioxidant. The multilayer film can be coextruded on a conventional blown film process. In a conventional blown film process the barrier layer is coextruded as the external layer in the blown film process. The barrier layer traps the volatile antioxidant inside the tube of the blown film process, reducing the amount of volatile antioxidant migrating from the film. The resulting film contains an increased level of the antioxidant.

DESCRIPTION OF THE PREFERRED EMBODIMENTS

The multilayer coextruded film of the present invention is advantageously used in producing containers for foodstuffs. These containers include bags, wraps, flexible containers, semirigid containers, and rigid containers. Preferably, these containers are bags.

The coextruded multilayer film of the present invention can be produced on a conventional blown film process. The multilayer film comprises a barrier layer and an antioxidant-containing layer ("antioxidant layer") adjacent to and positioned inside of the barrier layer during coextrusion on a conventional blown film process. The film may optionally include a control layer adjacent to and positioned inside of the antioxidant layer.

The desired migration rate of the volatile antioxidant and the desired toughness of the film must be considered in choosing the total thickness of the film. Generally, a thicker film results in a tougher film with a lower migration rate. The total thickness of the multilayer film is generally from about 1 mil to about 10 mils. Preferably, the total thickness of the multilayer film is from about 1 mil to about 2 mils.

For purposes of this invention, the barrier layer is effectively impermeable to any antioxidant(s) used. For example, the barrier layer can be made of high density polyethylene ("HDPE") or polyvinylidene chloride ("PVDC"). In a preferred embodiment of the present invention the barrier layer is made of high density polyethylene ("HDPE"). Preferably, the density of the HDPE used is from about 0,940 g/cc to about 1.090 g/cc.

Generally, the barrier layer is from about 0.2 mils to about 2.0 mils thick. Preferably, the thickness of the barrier layer is from about 0.2 mils to about 0.6 mils. More preferably, the thickness of the barrier layer is from about 0.3 mils to about 0.5 mils.

The antioxidant layer contains one or more volatile antioxidants. The volatile antioxidants useful in the present invention include, for example, butylated phenolic antioxidants, tert-butylhydroquinone ("TBHQ"), and propyl gallate ("PG"). Preferably, the antioxidants used are butylated phenolic antioxidants including, for example, butylated hydroxyanisole ("BHA") and butylated hydroxytoluene ("BHT"). Although the present invention allows for high retention of volatile antioxidants, the present invention does not preclude the use of other, nonvolatile antioxidants including, for example, Vitamin E, citric acid, ascorbic acid, and ascorbyl palmitate.

The antioxidant layer is semi-permeable to the volatile antioxidant used in the present invention. Preferably, the antioxidant layer comprises low density polyethylene ("LDPE"), linear low density polyethylene ("LLDPE"), or ethylene-vinyl acetate copolymer ("EVA"), or mixtures thereof. When the antioxidant layer comprises LDPE, the density of the LDPE is preferably from about 0,910 g/cc to about 0,940 g/cc.

Generally, the thickness of the antioxidant layer is from about 0.6 mils to about 6.0 mils. Preferably, the thickness of the antioxidant layer is from about 0.6 mils to about 1.2 mils. More preferably, the thickness of the antioxidant layer is from about 0.6 mils to about 0.9 mils.

The antioxidant is blended with the resin comprising the antioxidant layer. Generally, about 1 percent by weight of the antioxidant is incorporated into the resin. A dispersing agent may be used if necessary for uniform dispersion, or the two components may be fed simultaneously to a mixing hopper. The blend is then heat plasticized in the extruder and coextruded with the barrier layer through a conventional blown film coextrusion die with the barrier layer positioned external to the antioxidant layer.

The coextruded multilayer film may optionally include a control layer positioned internal to the antioxidant layer. The control layer, when used, is coextruded with the barrier layer and the antioxidant layer and positioned internal to both the barrier layer and antioxidant layer. The control layer has barrier properties sufficient to control the migration of the antioxidant from the antioxidant layer. Both the material used in the control layer and the thickness of the control layer can be adapted to control the migration of the antioxidant. The control layer cannot be a complete barrier to the antioxidant or the antioxidant would then become trapped in the antioxidant layer, never reaching the food stored in containers made from the film.

Generally, the control layer is semi-permeable to the volatile antioxidants used. Thus, the control layer can be made of the same material as the antioxidant layer. Preferably, the control layer comprises LDPE. Generally, the density of the LDPE in the control layer is from about 0,910 g/cc to about 0,940 g/cc.

Generally, the control layer is from about 0.2 mils to about 2.0 mils thick. Preferably, the thickness of the control layer is from about 0.2 mils to about 0.6 mils. More preferably, the thickness of the control layer is from about 0.3 mils to about 0.5 mils.

The barrier layer of the present invention, extruded on the outside of the annular die in a blown coextrusion film process, prevents any volatile antioxidant in the extruded film from escaping into the air surrounding the blown film process. Thus, any volatile antioxidant that migrates out of the film, must migrate through the antioxidant layer, and any control layer present.

Because the barrier layer is external to the antioxidant layer during the blown film process, any antioxidant migrating out of the film becomes trapped inside of the blown film tube. The concentration of antioxidant in the air trapped inside the blown film tube soon becomes high enough to hinder the migration of additional antioxidant out of the film.

Similarly, the barrier layer serves to prevent any volatile antioxidants from migrating outward from a bag made from the coextruded film. The barrier layer, being on the outside of the bag, traps the antioxidant inside the bag, reducing the migration of antioxidant from the film in the same manner that migration of the antioxidant is reduced during the blown extrusion film process. Additionally, bags made from the multilayer film of the present invention are typically stored without any air in the bag. Thus, during storage the two inner layers of the bag are adjacent each other leaving nowhere for the antioxidant to migrate except into the other inner layer.

EXAMPLE 1

A 2.0 mils thick coextruded three-layer film of the present invention was produced on a conventional blown film coextrusion process and made into storage bags. The barrier layer of the film was 0.4 mils thick and was made of high density polyethylene. The middle or antioxidant layer of the film was 1.2 mils thick and was made of low density polyethylene blended with 1740 parts per million ("PPM") of BHA and 1760 PPM of BHT. The control layer of the film was 0.4 mils thick and was made of low density polyethylene.

EXAMPLE 2

A 1.0 mils thick coextruded three-layer film of the present invention was produced on a conventional blown film process and made into storage bags. The barrier layer of the film was 0.2 mils thick and was made of high density polyethylene. The middle or antioxidant layer of the film was 0.6 mils thick and was made of low density polyethylene blended with 1760 PPM of BHA and 1760 PPM of BHT. The control layer of the film was 0.2 mils thick and was made of low density polyethylene.

Comparative Example

A coextruded three-layer film was produced via a conventional cast extrusion process. The film was similar to Example 1 except that it was produced via a conventional cast extrusion process rather than a conventional blown film process. During the extrusion process for the Comparative Example, antioxidants were visibly observed escaping into the air around the extrusion process. This is in contrast to the processing of Examples 1 and 2 where the only visibly observable antioxidants were trapped inside the tube of the conventional blown film process.

Antioxidant Retention Analysis

A gradient reverse phase liquid chromatographic method was developed to separate and quantitate the phenolic antioxidants in Example 1, Example 2, and the Comparative Example. Samples of Example 1 and Example 2 were analyzed during the first day after processing to determine the percent of original antioxidant retained in the film. Samples of Example 1 and Example 2 were stored at 76° F. (24.4° C.) and analyzed after 77 days, again to determine the percent of original antioxidant retained in the film. Samples of the Comparative Example were stored at 76° F. (24.4° C.) and analyzed after 7 days to determine the percent of original antioxidant retained in the film. Results of this analysis are shown in Table I.

TABLE I

| Example | Average Percent Antioxidant Retained | | |
|---|---|---|---|
| | 1st day | 7th day | 77th day |
| Comparative Example | — | 28 | — |
| Example 1 | 95 | — | 80 |
| Example 2 | 85 | — | 64 |

What is claimed is:

1. A method for making a coextruded film having increased retention of volatile antioxidants, comprising the step of coextruding in a blown film process:
   a) an inner antioxidant layer comprising a thermoplastic polymer containing a volatile antioxidant, the thermoplastic polymer being semipermeable with respect to the volatile antioxidant; and
   b) an outer barrier layer comprising a thermoplastic polymer impermeable with respect to the volatile antioxidant;
said outer layer forming the outside of the tube in the blown film process.

2. The method of claim 1 wherein the volatile antioxidant is a butylated phenolic antioxidant.

3. The method of claim 2 wherein the butylated phenolic antioxidant is either BHA or BHT.

4. The method of claim 1 wherein the barrier layer comprises a high density polyethylene.

5. The method of claim 4 wherein the density of the high density polyethylene is from about 0.940 g/cc to about 1.090 g/cc.

6. The method of claim 1 wherein the inner antioxidant layer comprises a low density polyethylene.

7. The method of claim 6 wherein the density of the low density polyethylene is from about 0.910 g/cc to about 0.940 g/cc.

8. The method of claim 1 wherein the inner antioxidant layer comprises an ethylene-vinyl acetate copolymer.

9. The method of claim 1 wherein the thickness of the outer barrier layer is from about 0.2 mils to about 0.6 mils.

10. The method of claim 1 wherein the thickness of the inner antioxidant layer is from about 0.6 mils to about 1.2 mils.

* * * * *